(12) United States Patent
Zhu et al.

(10) Patent No.: US 10,712,849 B2
(45) Date of Patent: Jul. 14, 2020

(54) METHOD FOR CONTROLLING SCREEN AND APPARATUS USING THE SAME

(71) Applicant: BEIJING XIAOMI MOBILE SOFTWARE CO., LTD., Beijing (CN)

(72) Inventors: Yin Zhu, Beijing (CN); Qian Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/958,730

(22) Filed: Apr. 20, 2018

(65) Prior Publication Data
US 2018/0307356 A1 Oct. 25, 2018

(51) Int. Cl.
*G09G 5/00* (2006.01)
*G06F 3/041* (2006.01)
(Continued)

(52) U.S. Cl.
CPC ............ *G06F 3/0412* (2013.01); *G06F 1/165* (2013.01); *G06F 1/1643* (2013.01);
(Continued)

(58) Field of Classification Search
CPC ........ G06F 3/0484; G06F 3/0485; G06F 3/02; G06F 3/033; G09G 5/00; G09G 5/08
See application file for complete search history.

(56) References Cited

U.S. PATENT DOCUMENTS

2005/0093826 A1* 5/2005 Huh .................... G06F 3/04886
345/168
2010/0169834 A1 7/2010 Wakizaka et al.
(Continued)

FOREIGN PATENT DOCUMENTS

CN 101515226 A 8/2009
CN 102541490 A 7/2012
(Continued)

OTHER PUBLICATIONS

Extended European Search Report issued in corresponding European Application No. 18169111.4, dated Sep. 19, 2018, 11 pages.
(Continued)

*Primary Examiner* — Pegeman Karimi
(74) *Attorney, Agent, or Firm* — Arch & Lake LLP

(57) ABSTRACT

A method for controlling a screen and an apparatus using the same are provided in the field of display technology. The screen includes a main display screen and an auxiliary display screen, both of which are touch screens on the same surface. The method includes: displaying a predetermined content on the auxiliary display screen; and receiving a first predetermined operation signal corresponding to the predetermined content and controlling the main display screen to perform a predetermined action according to the first predetermined operation signal, including at least one of adjusting screen brightness and switching an interface. The present disclosure solves the problem of a poor operation manner of a screen of a smartphone in the related art. The disclosure further provides linked operation between the main display screen and the auxiliary display screen, and enriches interactive operation forms.

17 Claims, 18 Drawing Sheets

(51) Int. Cl.

| | | |
|---|---|---|
| *G06F 1/16* | (2006.01) | |
| *G06F 1/3218* | (2019.01) | |
| *G06F 1/3234* | (2019.01) | |
| *G06F 3/0483* | (2013.01) | |
| *G06F 3/0488* | (2013.01) | |
| *G06F 3/0481* | (2013.01) | |
| *G06F 3/16* | (2006.01) | |

(52) U.S. Cl.
CPC .......... *G06F 1/1647* (2013.01); *G06F 1/3218* (2013.01); *G06F 1/3265* (2013.01); *G06F 3/0483* (2013.01); *G06F 3/0488* (2013.01); *G06F 3/04817* (2013.01); *G06F 3/167* (2013.01); *Y02D 10/153* (2018.01)

(56) References Cited

U.S. PATENT DOCUMENTS

| | | | |
|---|---|---|---|
| 2010/0240402 A1 | 9/2010 | Wickman et al. | |
| 2011/0271182 A1* | 11/2011 | Tsai | G06F 3/0483 715/702 |
| 2013/0050263 A1* | 2/2013 | Khoe | G06F 3/0481 345/634 |
| 2014/0015785 A1 | 1/2014 | Sato et al. | |
| 2014/0365885 A1* | 12/2014 | Carson | G06F 3/167 715/708 |
| 2014/0365945 A1* | 12/2014 | Karunamuni | G06F 3/0485 715/773 |
| 2015/0149354 A1* | 5/2015 | McCoy | G06F 3/167 705/42 |
| 2017/0010771 A1 | 1/2017 | Bernstein et al. | |
| 2017/0010846 A1 | 1/2017 | Bernstein et al. | |
| 2017/0010847 A1 | 1/2017 | Bernstein et al. | |
| 2017/0017391 A1 | 1/2017 | Hong et al. | |
| 2017/0024722 A1 | 1/2017 | Mhun et al. | |
| 2017/0097806 A1* | 4/2017 | Joshi | G06F 3/167 |
| 2017/0236513 A1* | 8/2017 | Choudhury | G06F 3/167 704/244 |
| 2018/0268777 A1* | 9/2018 | Kim | G06F 1/32 |
| 2018/0309806 A1* | 10/2018 | Huynh | H04L 65/403 |

FOREIGN PATENT DOCUMENTS

| | | |
|---|---|---|
| CN | 103338302 A | 10/2013 |
| CN | 103370924 A | 10/2013 |
| CN | 103473025 A | 12/2013 |
| CN | 106060191 A | 10/2016 |
| CN | 106233241 A | 12/2016 |
| CN | 106372869 A | 2/2017 |
| EP | 2126672 A1 | 12/2009 |
| EP | 2202626 A2 | 6/2010 |
| EP | 3082030 A1 | 10/2016 |
| EP | 3121779 A1 | 1/2017 |
| WO | 2015112868 A1 | 7/2015 |

OTHER PUBLICATIONS

International Search Report to PCT/CN2017/081737 dated Jan. 29, 2018 and English translation, (5p).
First Office Action issued to Chinese Application No. 201780000235.2 dated Jul. 2, 2019 with English translation, (49p).
First Office Action to European Patent Application No. 18169111.4 dated Jan. 31, 2020, (10p).

* cited by examiner

METHOD FOR CONTROLLING SCREEN AND APPARATUS USING THE SAME

CROSS-REFERENCE TO RELATED APPLICATION

The present application is based upon and claims priority to the Chinese Patent Application of the PCT application number PCT/CN2017/081737, filed on Apr. 24, 2017, the entire contents thereof are incorporated herein by reference.

TECHNICAL FIELD

The present disclosure relates to the field of display technology, and more particularly, to a method for controlling a screen and an apparatus using the same.

BACKGROUND

A screen of a smartphone is usually a touch screen, and the touch screen may respond to a touch operation of a user.

A display state of the screen can be classified into an active state and an inactive state. When the screen is in the active state, the screen may respond to a touch operation. When the screen is in the inactive state, the screen responds only to a wake-up operation but not to other operations. In order to save energy consumption of a mobile phone and to avoid misoperation of the user, the screen is usually in the inactive state when the user does not use the mobile phone. When the user needs to use the mobile phone, he/she switches the screen from the inactive state to the active state through the wake-up operation.

Since the dimming or brightening of the screen of the smart phone is usually implemented according to triggering of a physical key or touch operation on the screen, the operation manner is poor, which cannot meet more requirement of operating the screen from the user.

SUMMARY

In order to solve at least a part of the problem of a poor operation manner of a screen of a smartphone in the related art, embodiments of the present disclosure provide a method for controlling a screen and an apparatus using the same. The technical solution is as follows.

In a first aspect, there is provided a method for controlling a screen, wherein the screen includes a main display screen and an auxiliary display screen, both of the main display screen and the auxiliary display screen are touch screens and provided on the same surface, and the method includes:

displaying a predetermined content on the auxiliary display screen; and receiving a first predetermined operation signal corresponding to the predetermined content and controlling the main display screen to perform a predetermined action according to the first predetermined operation signal, wherein the predetermined action includes at least one of adjusting screen brightness and switching an interface.

In a second aspect, there is provided an apparatus for controlling a screen, where the screen comprises a main display screen and an auxiliary display screen, both of the main display screen and the auxiliary display screen are touch screens and provided on the same surface of the apparatus. The apparatus may include: a processor; and a memory for storing instructions executable by the processor. The processor is configured to perform:

displaying a predetermined content on the auxiliary display screen; and receiving a first predetermined operation signal corresponding to the predetermined content and controlling the main display screen to perform a predetermined action according to the first predetermined operation signal, wherein the predetermined action includes at least one of adjusting screen brightness and switching an interface.

In a third aspect, there is provided a non-transitory storage medium having stored therein instructions that, when executed by one or more processors of a terminal having a screen, wherein the screen comprises a main display screen and an auxiliary display screen and both of the main display screen and the auxiliary display screen are touch screens and provided on the same surface, causes the terminal to control the screen by performing:

displaying a predetermined content on the auxiliary display screen; and receiving a first predetermined operation signal corresponding to the predetermined content and controlling the main display screen to perform a predetermined action according to the first predetermined operation signal, wherein the predetermined action comprises at least one of adjusting screen brightness and switching an interface.

The technical solution provided by embodiments of the present disclosure may have the following beneficial effects.

A main display screen and an auxiliary display screen are provided on a screen, and a predetermined content is displayed on the auxiliary display screen. A first predetermined operation signal corresponding to the predetermined content is received through the auxiliary display screen, and the main display screen is controlled to perform a predetermined action of adjusting screen brightness or switching an interface according to the first predetermined operation signal, such that linked operation between the main display screen and the auxiliary display screen may be realized, which solves the problem of a poor operation manner of a single screen, achieves the effect of providing linked operation between the main display screen and the auxiliary display screen, and enriches interactive operation forms.

BRIEF DESCRIPTION OF THE DRAWINGS

In order to more clearly illustrate the technical solution in the embodiments of the present disclosure, the drawings to be used in the description of the embodiments will be briefly described below. It will be apparent that the drawings in the following description are merely some embodiments of the present disclosure. Other drawings may be obtained by those skilled in the art based on these drawings without paying for creative labor.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claim.

The terms used herein are merely for describing a particular embodiment, rather than limiting the present disclosure. As used in the present disclosure and the appended claims, terms in singular forms such as "a" "said" and "the" are intended to also include plural forms, unless explicitly dictated otherwise. It should also be understood that the term "and/or" used herein means any one or any possible combination of one or more associated listed items.

It should be understood that, although it may describe an element with a term first, second, or third, etc., the element is not limited by these terms. These terms are merely for distinguishing among elements of the same kind. For example, without departing from the scope of the present disclosure, a first element can also be referred to as a second element. Similarly, a second element can also be referred to as a first element. Depending on the context, a term "if" as used herein can be interpreted as "when," "where," or "in response to."

Figure 1:
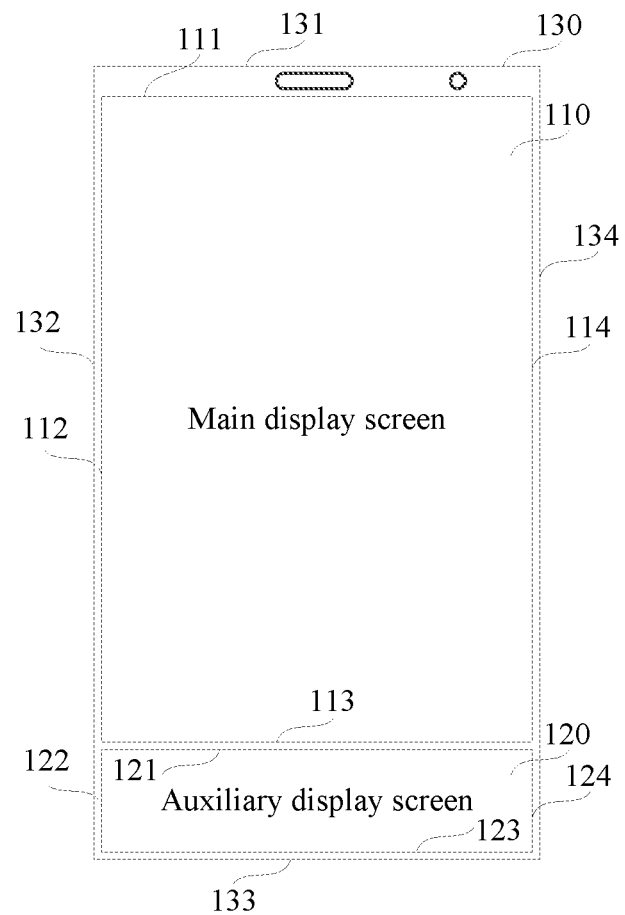
FIG. 1 is a schematic diagram of a terminal shown according to an aspect of the disclosure.

FIG. 1 is a schematic diagram of a terminal shown according to an aspect of the disclosure. As shown in FIG. 1, the terminal includes a screen.

The screen includes a main display screen 110 and an auxiliary display screen 120. Both of the main display screen 110 and the auxiliary display screen 120 are touch screens, and the main display screen 110 and the auxiliary display screen 120 are provided on the same surface.

As shown in FIG. 1, in one example, the main display screen 110 and the auxiliary display screen 120 are two separate screens on the same side of the terminal.

Referring to FIG. 1, the terminal further includes a middle frame 130, which includes an upper border 131, a left border 132, a lower border 133 and a right border 134 which are successively connected.

The main display screen 110 includes a first upper edge 111, a first left edge 112, a first lower edge 113 and a first right edge 114. The auxiliary display screen 120 includes a second upper edge 121, a second left edge 122, a second lower edge 123 and a second right edge 124.

In the example, the first left edge 112 of the main display screen 110 is in contact with the left border 132 of the middle frame 130. The first right edge 114 of the main display screen 110 is in contact with the right border 134 of the middle frame 130.

The second left edge 122 of the auxiliary display screen 120 is in contact with the left border 132 of the middle frame 130. The second right edge 124 of the auxiliary display screen 120 is in contact with the right border 134 of the middle frame 130. The second lower edge 123 of the auxiliary display screen 120 is in contact with the lower border 133 of the middle frame 130.

The first lower edge 113 of the main display screen 110 is in contact with the second upper edge 121 of the auxiliary display screen 120.

In addition, a length of the first left edge 112 of the main display screen 110 is equal to a length of the first right edge 114. A length of the second left edge 122 of the auxiliary display screen 120 is equal to a length of the second right edge 124. A length of the first left edge 112 of the main display screen 110 is longer than a length of the second left edge 122 of the auxiliary display screen 120.

Figure 2:
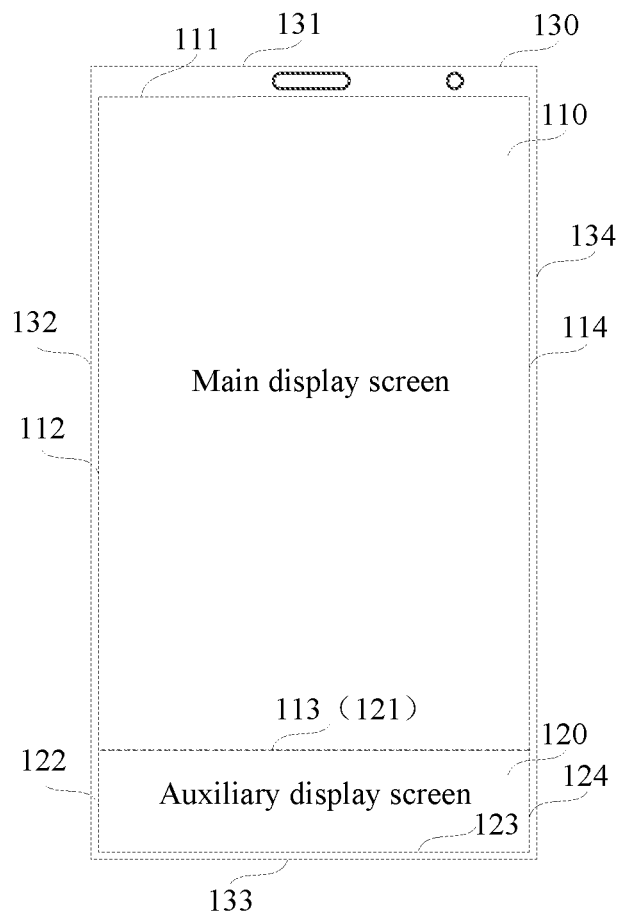
FIG. 2 is another schematic diagram of a terminal shown according to an aspect of the disclosure.

As shown in FIG. 2, in another implementation, a main display screen 110 and an auxiliary display screen 120 are two display regions in one screen.

Referring to FIG. 2, the main display screen 110 includes a first upper edge 111, a first left edge 112, a first lower edge 113, and a first right edge 114. The auxiliary display screen 120 includes a second upper edge 121, a second left edge 122, a second lower edge 123 and a second right edge 124.

The first upper edge 111 of the main display screen 110 is an upper edge of the screen. The second lower edge 123 of the auxiliary display screen 120 is a lower edge of the screen. The first lower edge 113 of the main display screen 110 is the second upper edge 121 of the auxiliary display screen 120.

A length of the first left edge 112 of the main display screen 110 is equal to a length of the first right edge 114. A length of the second left edge 122 of the auxiliary display screen 120 is equal to a length of the second right edge 124. A length of the first left edge 112 is longer than a length of the second left edge 122.

In addition, the terminal further includes a middle frame 130, which includes an upper border 131, a left border 132, a lower border 133 and a right border 134 which are successively connected.

In the example, a left edge of the screen is in contact with the left border 132 of the middle frame 130, and a right edge of the screen is in contact with the right border 134 of the middle frame 130. That is, the first left edge 112 of the main display screen 110 is in contact with the left border 132 of the middle frame 130. The first right edge 114 of the main display screen 110 is in contact with the right border 134 of the middle frame 130. The second left edge 122 of the auxiliary display screen 120 is in contact with the left border 132 of the middle frame 130. The second right edge 124 of the auxiliary display screen 120 is in contact with the right border 134 of the middle frame 130.

The lower edge of the screen is in contact with the lower border 133 of the middle frame 130, i.e., the second lower edge 123 of the auxiliary display screen 120 is in contact with the lower border 133 of the middle frame 130.

Since a length of the first left edge 112 is longer than a length of the second left edge 122, an area of the main display screen 110 is larger than an area of the auxiliary display screen 120.

Figure 3:
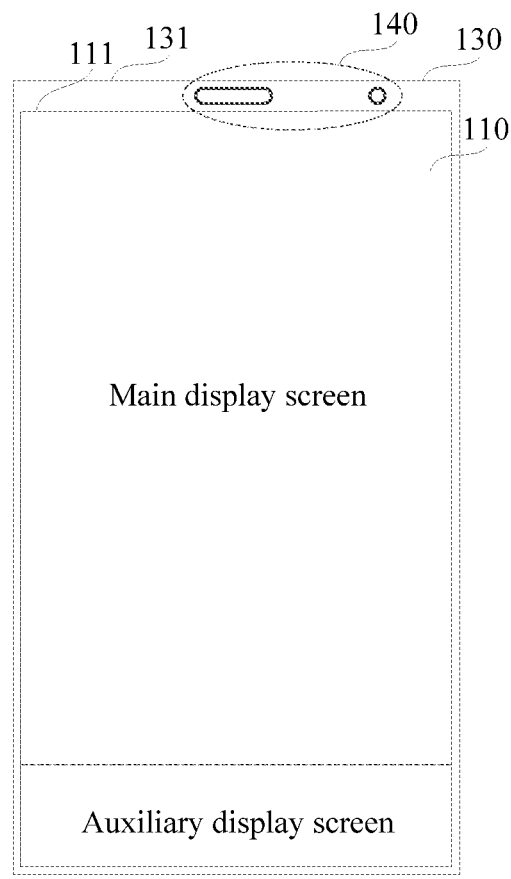
FIG. 3 is yet another schematic diagram of a terminal shown according to an aspect of the disclosure.

FIG. 3 is combined with and referred to. A front panel of the terminal further includes other elements 140 including at least one of a front camera, a handset, a microphone, a distance sensor and a light sensor. As an example, the aforesaid other elements 140 in FIG. 3 are provided between the upper edge of the display screen and the upper border 131 of the middle frame 130, i.e., the aforesaid other elements 140 are provided between the first upper edge 111 of the main display screen 110 and the upper border 131 of the middle frame 130.

In other possible implementations, the other elements 140 may be provided at other locations of the front panel of the terminal, which is not limited to be between the first upper edge 111 and the upper border 131 of the middle frame 130.

Figure 4:
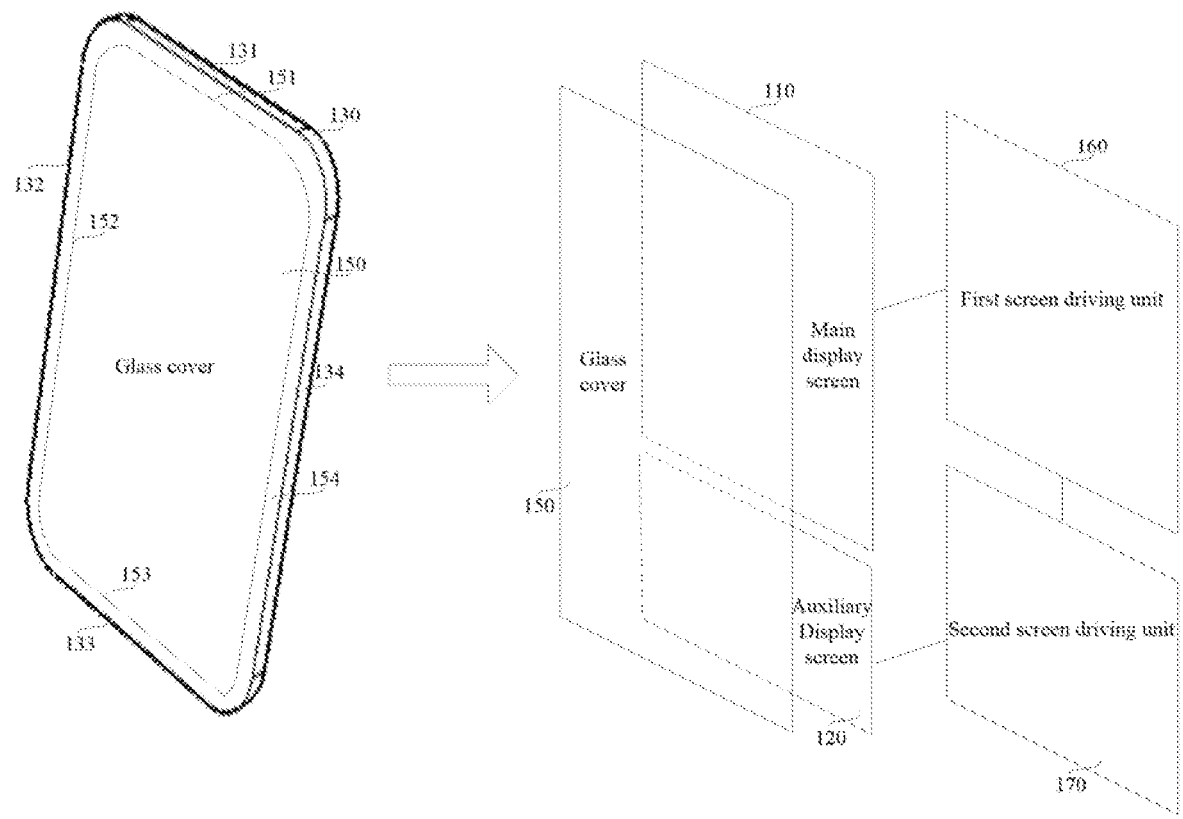
FIG. 4 is yet another schematic diagram of a terminal shown according to an aspect of the disclosure.

With respect to the terminal shown in FIG. 1, FIG. 4 is combined with and referred to, and the terminal further includes a glass cover 150, a first screen driving unit 160, and a second screen driving unit 170.

The glass cover 150 is located above the main display screen 110 and the auxiliary display screen 120.

The glass cover 150 includes an upper edge 151, a left edge 152, a lower edge 153 and a right edge 154. The upper edge 151 of the glass cover 150 is in contact with the upper frame 131 of the middle frame 130. The left edge 152 of the glass cover 150 is in contact with the left border 132 of the middle frame 130. The lower edge 153 of the glass cover 150 is in contact with the lower border 133 of the middle frame 130. The right edge 154 of the glass cover 150 is in contact with the right border 134 of the middle frame 130.

Optionally, referring to FIG. 4, the first screen driving unit 160 is connected to the second screen driving unit 170. The main display screen 110 is connected to the first screen driving unit 160. The auxiliary display screen 120 is connected to the second screen driving unit 170.

In the example, the first screen driving unit 160 is used to control the display of the main display screen 110, and the second screen driving unit 170 is used to control the display of the auxiliary display screen 120.

Figure 5:
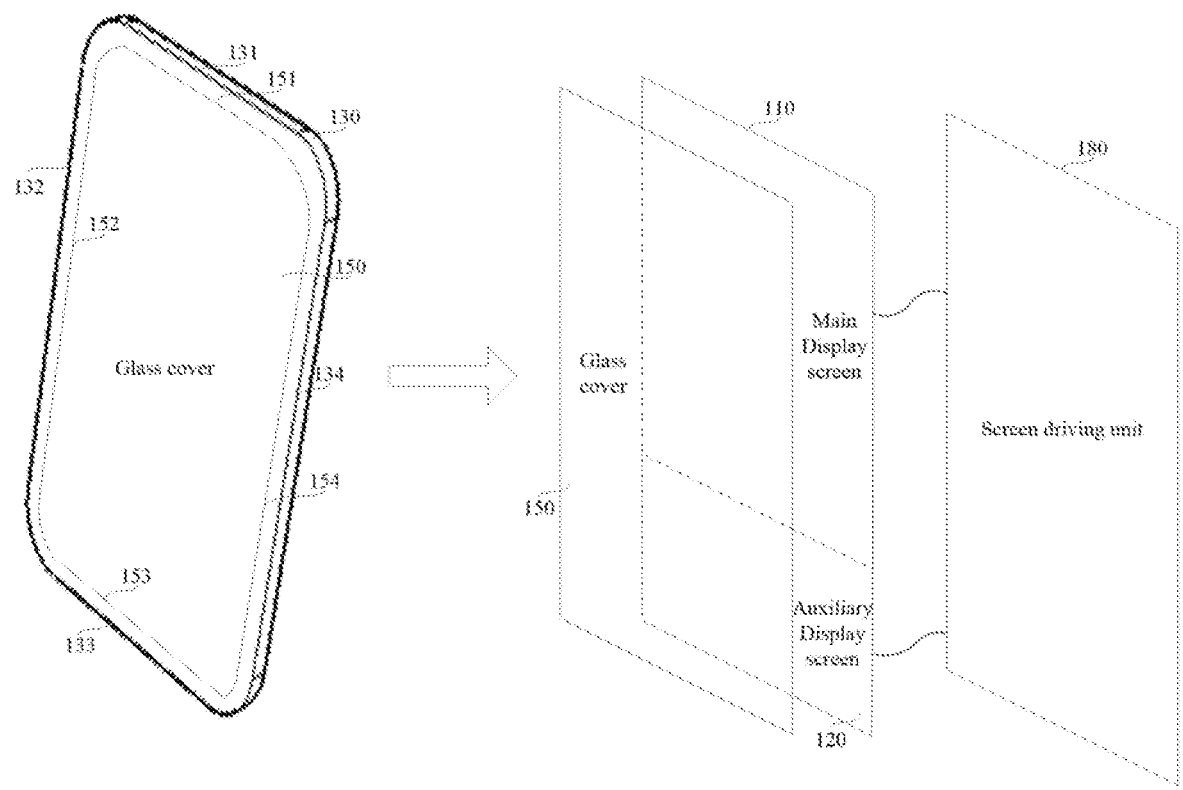
FIG. 5 is yet another schematic diagram of a terminal shown according to an aspect of the disclosure.

With respect to the terminal shown in FIG. 2, FIG. 5 is combined with and referred to, and the terminal further includes a glass cover 150 and a screen driving unit 180.

The glass cover 150 is located above the screen, i.e., the glass cover 150 is located above the main display screen 110 and the auxiliary display screen 120 of the screen.

The glass cover 150 includes an upper edge 151, a left edge 152, a lower edge 153 and a right edge 154. The upper edge 151 of the glass cover 150 is in contact with the upper border 131 of the middle frame 130. The left edge 152 of the glass cover 150 is in contact with the left border 132 of the middle frame 130. The lower edge 153 of the glass cover 150 is in contact with the lower border 133 of the middle frame 130. The right edge 154 of the glass cover 150 is in contact with the right border 134 of the middle frame 130.

Optionally, referring to FIG. 5, the screen driving unit 180 is connected to the screen. That is, the screen driving unit 180 is connected to the main display screen 110 and the auxiliary display screen 120 of the screen.

Optionally, the screen driving unit 180 is used to control the display of the main display screen 110.

Optionally, the screen driving unit 180 is used to control the display of the auxiliary display screen 120.

Optionally, the screen driving unit 180 is used to control the display of the main display screen 110 and the auxiliary display screen 120.

Figure 6:
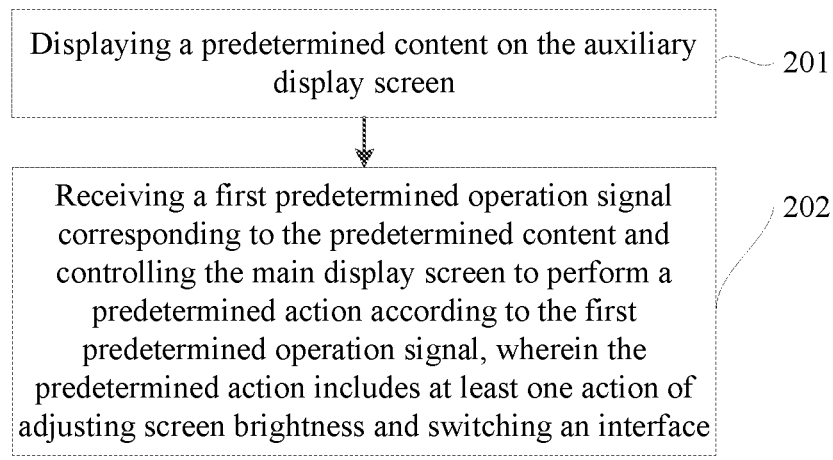
FIG. 6 is a flow chart of a method for controlling a screen shown according to an aspect of the disclosure.

FIG. 6 is a flow chart of a method for controlling a screen shown according to an aspect of the disclosure. The method for controlling a screen is applied to the terminals as shown in FIGS. 1 to 5. As shown in FIG. 6, the method for controlling a screen may include following steps.

In step 201, a predetermined content is displayed on the auxiliary display screen.

In step 202, a first predetermined operation signal corresponding to the predetermined content is received and the main display screen is controlled to perform a predetermined action according to the first predetermined operation signal, where the predetermined action including at least one actions of adjusting screen brightness and switching an interface. For example, the predetermined action may be one of following actions: brightening the screen, dimming the screen, switching the interface on the main display screen, switching the interface on the auxiliary display screen, or switching both interfaces on the main display screen and the auxiliary display screen.

In view of above, according to the method for controlling a screen provided by the embodiment of the present disclosure, a main display screen and an auxiliary display screen are provided on a screen, and a predetermined content is displayed on the auxiliary display screen. A first predetermined operation signal corresponding to the predetermined content is received through the auxiliary display screen, and the main display screen is controlled to perform a predetermined action of adjusting screen brightness or switching an interface according to the first predetermined operation signal, such that linked operation between the main display screen and the auxiliary display screen may be realized, which solves the problem of a poor operation manner of a single screen, achieves the effect of providing linked operation between the main display screen and the auxiliary display screen, and enriches interactive operation forms.

Figure 7:
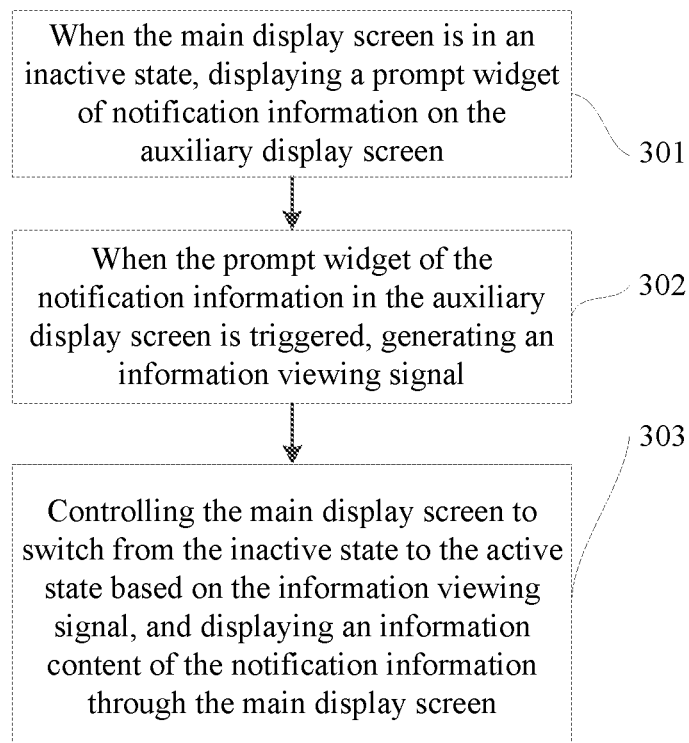
FIG. 7 is another flow chart of a method for controlling a screen shown according to an aspect of the disclosure.

FIG. 7 is another flow chart of a method for controlling a screen shown according to an aspect of the disclosure. The method for controlling a screen is applied to the terminals as shown in FIGS. 1 to 5. As shown in FIG. 7, the method for controlling a screen may include following steps.

In step 301, when the main display screen is in an inactive state, a prompt widget of notification information is displayed on the auxiliary display screen.

The prompt widget is used to prompt presence of unread notification information.

When the main display screen is in the inactive state, the main display screen does not respond to the operation acting on the main display screen.

In step 302, when the prompt widget of the notification information in the auxiliary display screen is triggered, an information viewing signal is generated.

In actual implementation, when the prompt widget of the notification information in the auxiliary display screen is triggered, that is, when the prompt widget is triggered due to touch operation performed on a position of the prompt widget of the notification information in the auxiliary display screen from a user, the terminal generates the information viewing signal corresponding to the prompt widget of the notification information.

In step 303, the main display screen is controlled to switch from the inactive state to the active state based on the information viewing signal, and an information content of the notification information is displayed through the main display screen.

The information viewing signal is used to trigger the main display screen to switch to a brightened screen and to control the main display screen to display the information content of the notification information corresponding to the information viewing signal.

Figure 8:
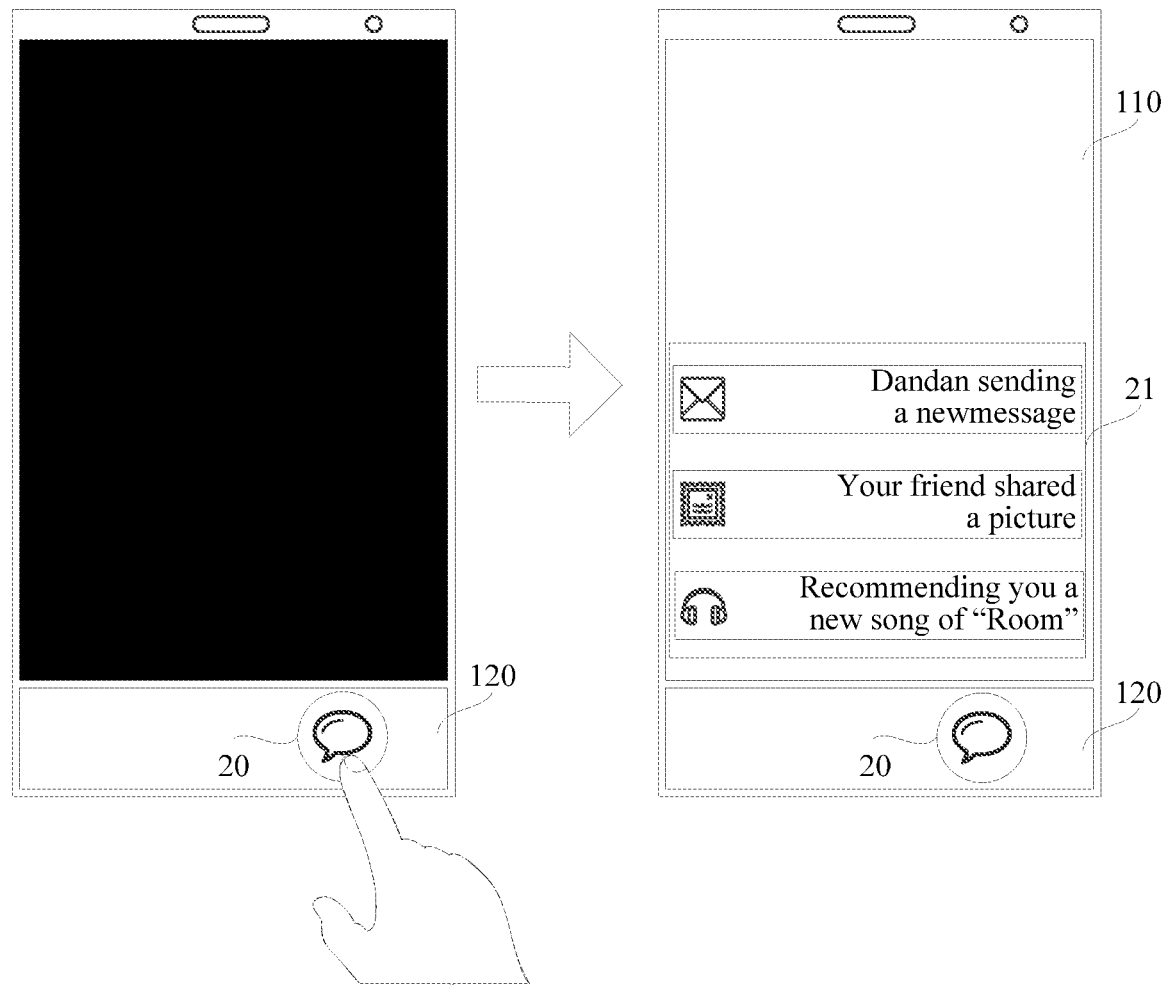
FIG. 8 is a schematic diagram of awakening a main display screen shown according to an aspect of the disclosure.

FIG. 8 is combined with and referred to. The main display screen 110 is in an inactive state, and a prompt widget 20 of the notification information is displayed in the auxiliary display screen 120. When the prompt widget 20 is triggered, the main display screen 110 is switched from the inactive state to an active state, and information content 21 of the notification information is displayed in the main display screen 110.

In view of above, through the method for controlling a screen provided by the embodiment of the present disclosure, a prompt widget of notification information is displayed in the auxiliary display screen, and a main display screen is controlled to be brightened when the prompt widget is triggered, so that the main display screen may achieve linked display based on operation in the auxiliary display screen, thus enriching interactive operation forms.

Figure 9:
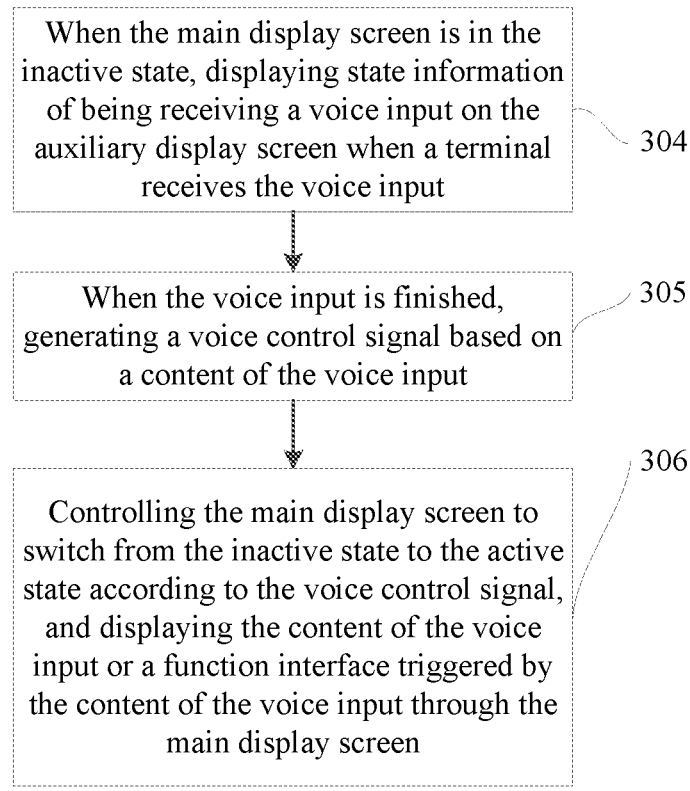
FIG. 9 is yet another flow chart of a method for controlling a screen shown according to an aspect of the disclosure.

FIG. 9 is yet another flow chart of a method for controlling a screen shown according to an aspect of the disclosure. The method for controlling a screen is applied to the terminals as shown in FIGS. 1 to 5. As shown in FIG. 9, the method for controlling a screen may include following steps.

In step 304, when the main display screen is in the inactive state, state information of being receiving a voice input is displayed on the auxiliary display screen when the terminal receives the voice input.

When the user performs a voice input to the terminal, the state information of being receiving the voice input is displayed through the auxiliary display screen, to inform the user that the terminal is receiving the voice input.

In step 305, when the voice input is finished, a voice control signal is generated based on a content of the voice input.

In step 306, the main display screen is controlled to switch from the inactive state to the active state according to the voice control signal, and the content of the voice input or a function interface triggered by the content of the voice input is displayed through the main display screen.

The voice control signal is used to trigger the main display screen to switch to a brightened screen and to control the main display screen to display the content of the voice input or a function interface triggered by the content of the voice input. For example, the terminal receives a section of the voice input, and a text content of the voice input is displayed on the main display screen, which dispenses with the operation of manually entering the text from the user. As another example, the terminal receives the voice input of "call Wang", and the main display screen displays a dial-up interface to Wang.

In view of above, through the method for controlling a screen provided by the embodiment of the present disclosure, state information of being receiving a voice input is displayed on the auxiliary display screen when the voice is input, and a main display screen may be controlled to be brightened and display corresponding contents based on the voice control signal generated when the voice input is finished, such that the main display screen may achieve linked display based on operation in the auxiliary display screen, thus enriching interactive operation forms.

Figure 10:
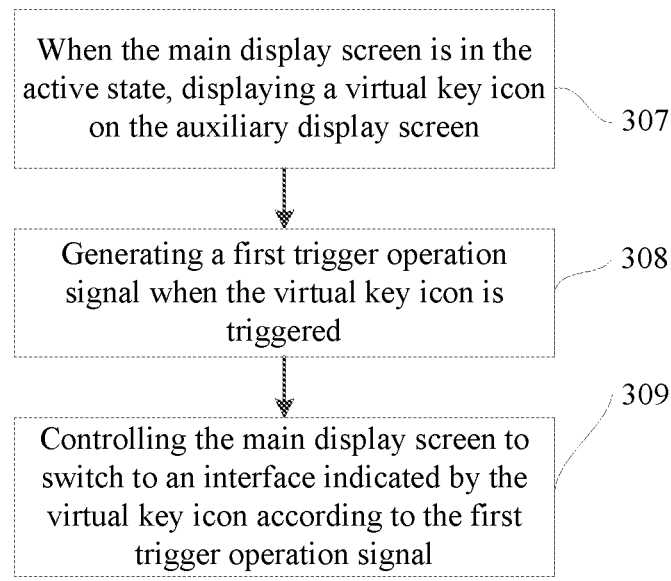
FIG. 10 is yet another flow chart of a method for controlling a screen shown according to an aspect of the disclosure.

FIG. 10 is yet another flow chart of a method for controlling a screen shown according to an aspect of the disclosure. The method for controlling a screen is applied to the terminals as shown in FIGS. 1 to 5. As shown in FIG. 10, the method for controlling a screen may include following steps.

In step 307, when the main display screen is in an active state, a virtual key icon is displayed on the auxiliary display screen.

The virtual key icon is a logical key corresponding to an operating system. The virtual key icon includes at least one of a menu widget, a homepage widget and a return widget.

Figure 11:
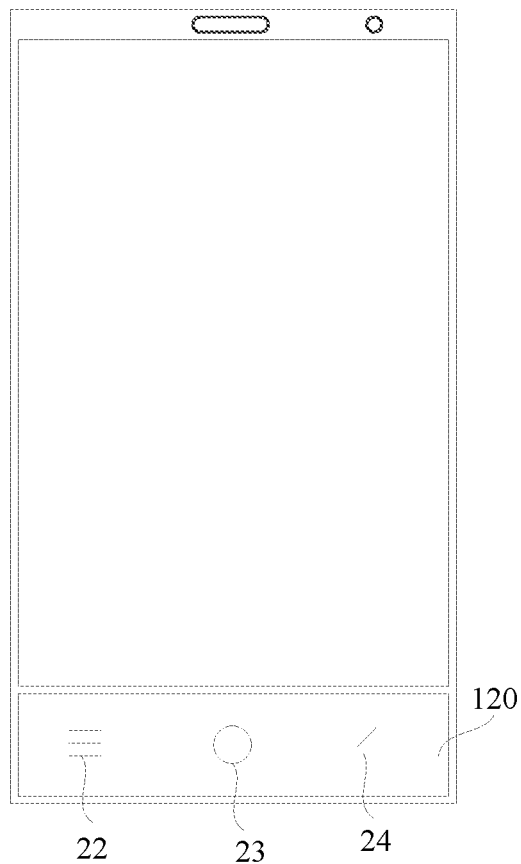
FIG. 11 is a schematic diagram of a virtual key icon shown according to an aspect of the disclosure.

FIG. 11 is combined with and referred to. A menu widget 22, a homepage widget 23, and a return widget 24 are displayed in the auxiliary display screen 120.

In step 308, a first trigger operation signal is generated when the virtual key icon is triggered.

In step 309, the main display screen is controlled to switch to an interface indicated by the virtual key icon according to the first trigger operation signal.

Optionally, when the menu widget is triggered, the main display screen displays various applications that are running.

Optionally, when the homepage widget is triggered, the main display screen displays a default interface of the operating system.

Optionally, when the return widget is triggered, the main display screen displays a previous interface of the current interface.

In view of above, in the method for controlling a screen provided by the embodiment of the present disclosure, when a virtual key icon on an auxiliary display screen is triggered, a first trigger operation signal is generated to control a main display screen to switch an interface, so that the terminal may satisfy normal requirement of screen control.

Figure 12:
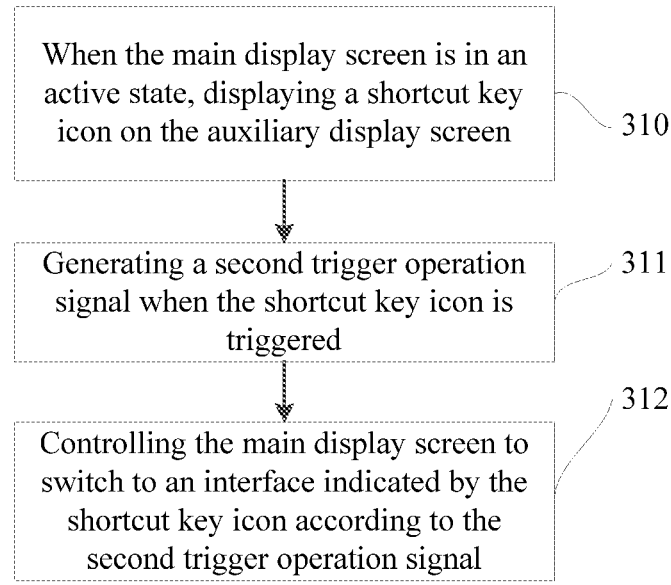
FIG. 12 is yet another flow chart of a method for controlling a screen shown according to an aspect of the disclosure.

FIG. 12 is yet another flow chart of a method for controlling a screen shown according to an aspect of the disclosure. The method for controlling a screen is applied to the terminals as shown in FIGS. 1 to 5. As shown in FIG. 12, the method for controlling a screen may include following steps.

In step 310, when the main display screen is in an active state, a shortcut key icon is displayed on the auxiliary display screen.

The shortcut key icon is a shortcut key corresponding to a predetermined function. The shortcut key icon includes at least one of a search widget, a screenshot widget, a collection widget, a flashlight switch widget, a recording widget and a photographing widget.

Optionally, in actual implementation, the shortcut key icon may also be icons corresponding to other types of shortcut functions, which is not limited to those exemplified in the present embodiment.

In step 311, a second trigger operation signal is generated when the shortcut key icon is triggered.

Optionally, a manner for triggering the shortcut key icon is at least one of long press, sliding, and 3D touch. The present embodiment does not limit the trigger manner of the shortcut key icon.

In step 312, the main display screen is controlled to switch to an interface indicated by the shortcut key icon according to the second trigger operation signal.

For example, when a search widget is triggered, the main display screen is switched to a search interface.

In view of above, in the method for controlling a screen provided by the embodiment of the present disclosure, a second trigger operation signal is generated to control a main display screen to switch an interface when a shortcut key icon on an auxiliary display screen is triggered, so that the terminal may achieve a shortcut function according to operation on the auxiliary display screen, which improves operation efficiency.

Figure 13:
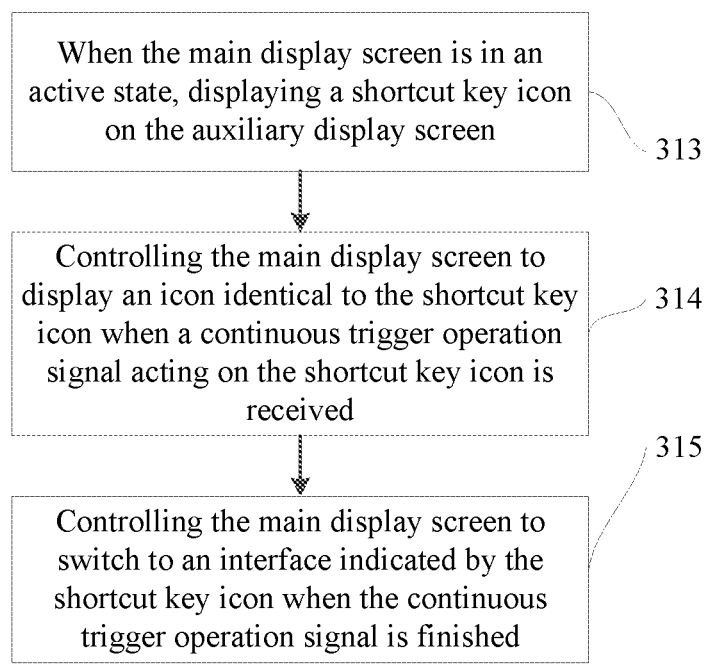
FIG. 13 is yet another flow chart of a method for controlling a screen shown according to an aspect of the disclosure.

FIG. 13 is yet another flow chart of a method for controlling a screen shown according to an aspect of the disclosure. The method for controlling a screen is applied to the terminals as shown in FIGS. 1 to 5. As shown in FIG. 13, the method for controlling a screen may include following steps.

In step 313, when the main display screen is in an active state, a shortcut key icon is displayed on the auxiliary display screen.

In step 314, the main display screen is controlled to display an icon identical to the shortcut key icon when a continuous trigger operation signal acting on the shortcut key icon is received.

Optionally, in practical applications, the continuous trigger operation corresponds to long press operation of a user.

Figure 14:
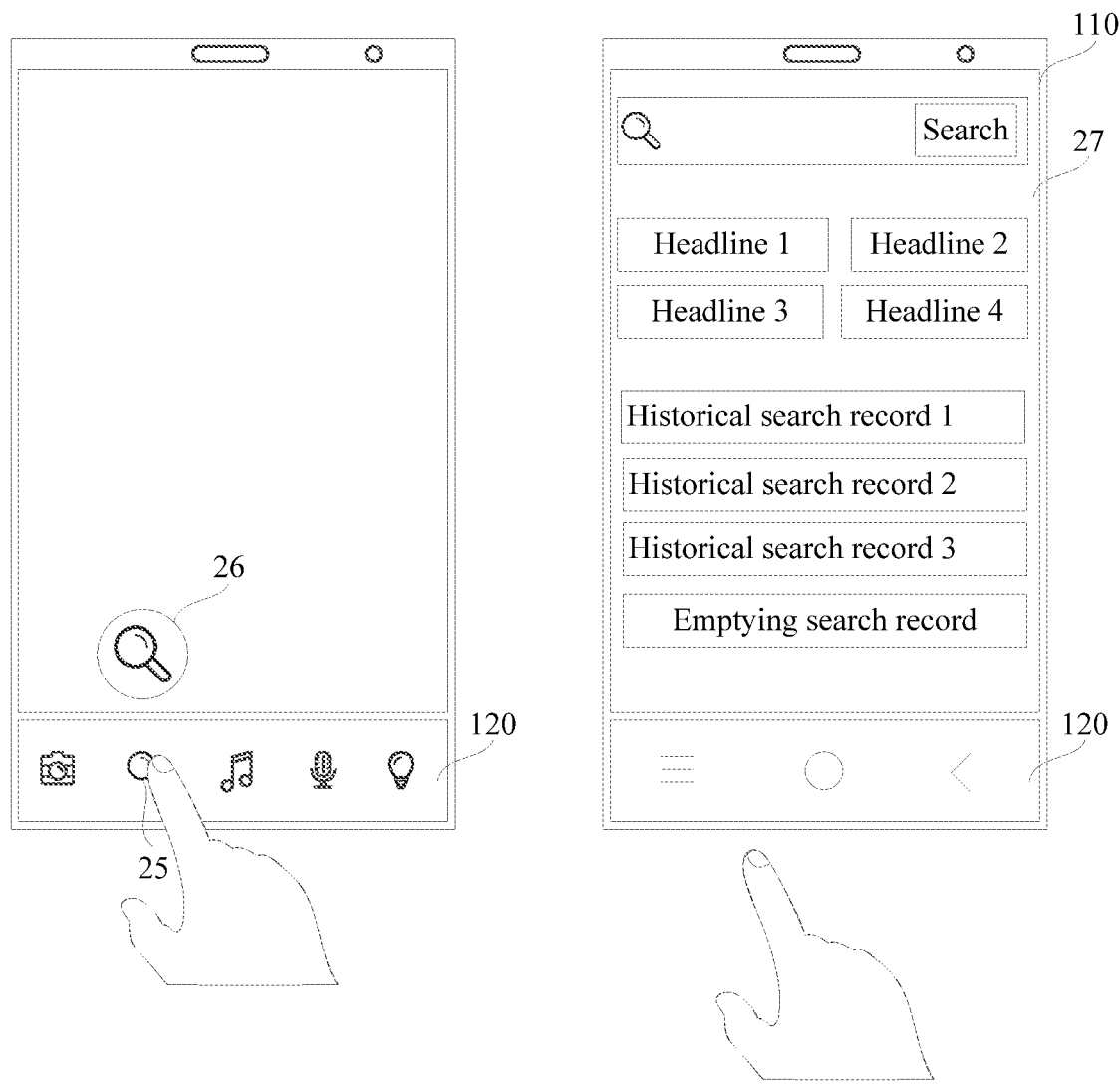
FIG. 14 is a schematic diagram of implementing linked operation between a main display screen and an auxiliary display screen shown according to an aspect of the disclosure.

FIG. 14 is combined with and referred to. For example, when a search widget 25 in an auxiliary display screen 120 is continuously triggered, a corresponding suspension search widget 26 is displayed in a main display screen 110.

In a possible implementation, the floating search widget 26 displayed in the main display screen 110 is enlarged in proportion to the search widget 25 in the auxiliary display screen 120, in order to facilitate viewing the widget being triggered.

In step 315, the main display screen is controlled to switch to an interface indicated by the shortcut key icon when the continuous trigger operation signal is finished.

Optionally, the finish of the continuous trigger operation signal corresponds to the release of the long press operation of the user.

FIG. 14 is combined with and referred to. When the user releases the long press operation after a long press, that is, the continuous trigger operation signal is finished, the main display screen 110 displays an interface 27 corresponding to the search widget 25.

In view of above, in a method for controlling a screen provided by the embodiment of the present disclosure, when a shortcut key icon on an auxiliary display screen is continuously triggered, the same icon is displayed in a main display screen. In this way, when a finger shields a shortcut key icon in the auxiliary display screen, it may facilitate the user viewing the icon to be triggered. In addition, the main display screen is controlled to switch an interface when the continuous trigger operation signal is finished, such that a terminal may achieve a shortcut function according to operation on the auxiliary display screen, which improves operation efficiency.

Optionally, the shortcut key icons in FIG. 12 or FIG. 13 are arranged in a preset order in the auxiliary display screen. In practical applications, the preset order may be set by the user on his/her own.

When an icon adding instruction is received, a shortcut key icon corresponding to the icon adding instruction is added to the auxiliary display screen.

When an icon deleting instruction is received, the shortcut key icon corresponding to the icon deleting instruction is deleted from the auxiliary display screen.

In practical applications, the addition or deletion of the shortcut key icon may be customized by the user according to actual needs. Optionally, shortcut key icons which did not exist in the auxiliary display screen may be added to the auxiliary display screen. The shortcut key icons which have already existed in the auxiliary display screen may be deleted from the auxiliary display screen.

Optionally, the auxiliary display screen will automatically display the virtual key icon after the main display screen performs the interface switching.

Optionally, when the main display screen is switched to a predetermined interface, the terminal controls the auxiliary display screen to display a shortcut key icon corresponding to the predetermined interface.

For example, when the main display screen is switched to a browser interface, the terminal controls the auxiliary display screen to display at least one of a search widget, a collection widget and a page switching widget.

The search widget is used to trigger the browser to search for keywords entered by the user, and the keyword is a target content that the user desires to search for.

The collection widget is used to collect webpages that are being browsed.

The page switching widget is used to perform fast page turning to front or back pages of the webpages.

Optionally, when the main display screen is in an active state, a first interface or a second interface is displayed in the auxiliary display screen. The first interface includes a virtual key icon and the second interface includes a shortcut key icon.

The terminal receives a second predetermined operation acting on the auxiliary display screen to generate a second predetermined operation signal; and controls the auxiliary display screen to switch between the first interface and the second interface according to the second predetermined operation signal.

Figure 15:
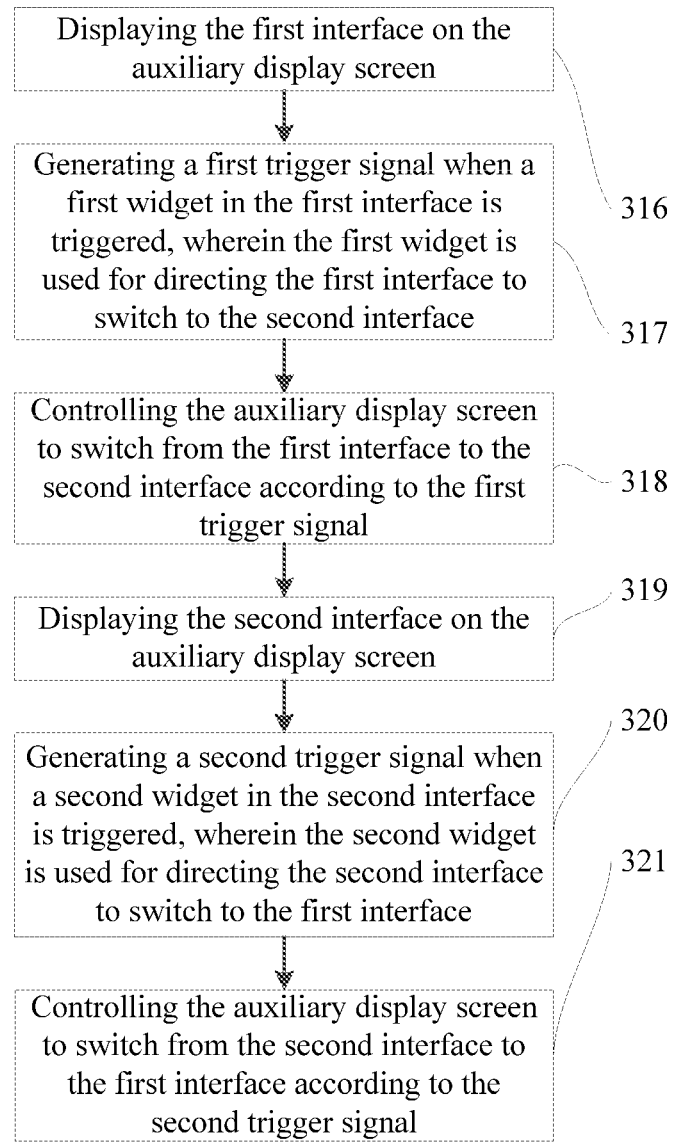
FIG. 15 is yet another flow chart of a method for controlling a screen shown according to an aspect of the disclosure.
Figure 17:
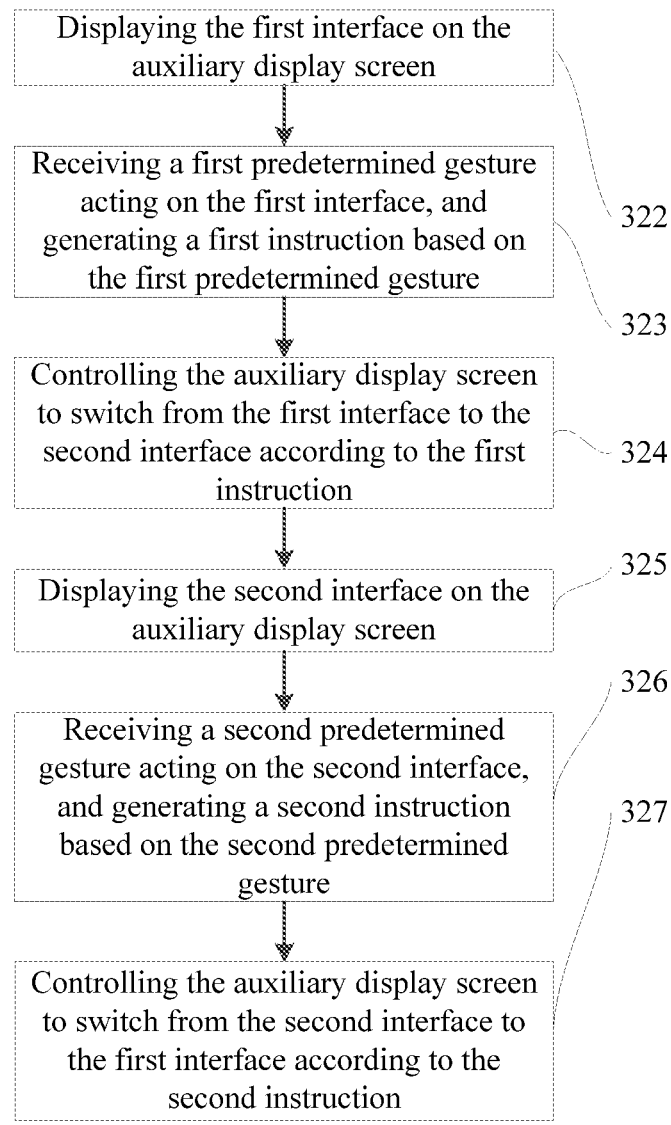
FIG. 17 is yet another flow chart of a method for controlling a screen shown according to an aspect of the disclosure.

Optionally, there are two possible implementations of generating the second predetermined operation signal. Referring to FIG. 15, it is a manner triggered through a widget. Referring to FIG. 17, it is a manner triggered through a predetermined gesture.

FIG. 15 is yet another flow chart of a method for controlling a screen shown according to an aspect of the disclosure. The method for controlling a screen is applied to the terminals as shown in FIGS. 1 to 5. As shown in FIG. 15, the method for controlling a screen may include following steps.

In step 316, the first interface is displayed on the auxiliary display screen.

In step 317, a first trigger signal is generated when a first widget in the first interface is triggered, wherein the first widget is used for directing the first interface to switch to the second interface.

In step 318, the auxiliary display screen is controlled to switch from the first interface to the second interface according to the first trigger signal.

In step 319, the second interface is displayed on the auxiliary display screen.

In step 320, a second trigger signal is generated when a second widget in the second interface is triggered, wherein the second widget is used for directing the second interface to switch to the first interface.

In step 321, the auxiliary display screen is controlled to switch from the second interface to the first interface according to the second trigger signal.

Figure 16:
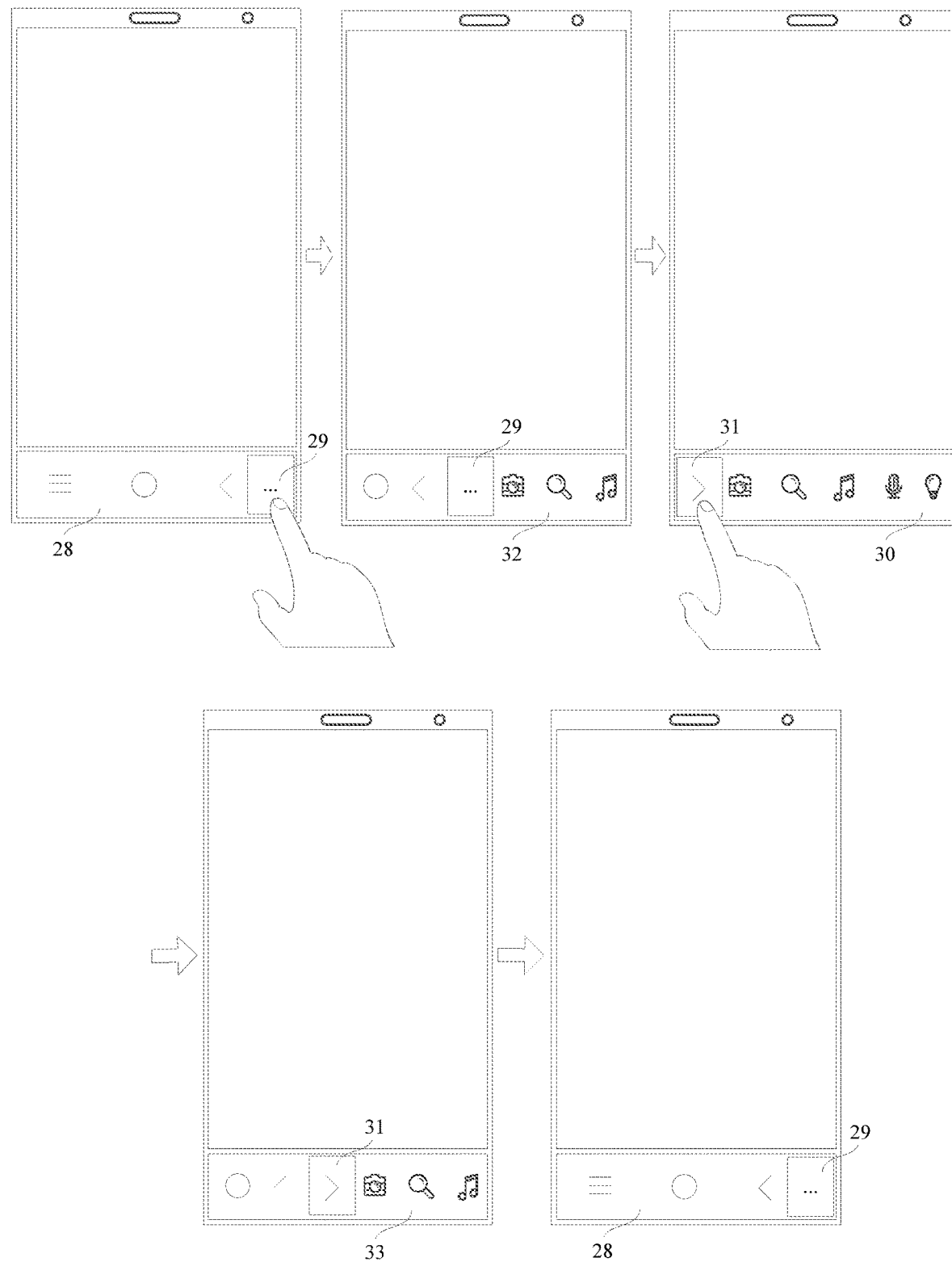
FIG. 16 is a schematic diagram of interface switching of an auxiliary display screen shown according to an aspect of the disclosure.

FIG. 16 is a schematic diagram of interface switching of an auxiliary display screen shown according to an aspect of the disclosure. When the auxiliary display screen displays a first interface 28, the first interface 28 includes a virtual key icon (a menu widget, a homepage widget or a return widget) and a first widget 29. When the first widget 29 is triggered, the auxiliary display screen is switched from the first interface 28 to a second interface 30. The second interface 30 includes a shortcut key icon (a search widget, a photographing widget or a recording widget, etc.) and a second widget 31. When the second widget 31 is triggered, the auxiliary display screen is switched from the second interface 30 to the first interface 28. Optionally, when the auxiliary display screen is switched between the first interface 28 and the second interface 30, a switching process may be dynamically displayed. For example, when the auxiliary display screen is switched from the first interface 28 to the second interface 30, a first transition interface 32 of switching from the first interface 28 to the second interface 30 may be displayed. The first transition interface 32 takes a first widget 29 as a boundary, a part of virtual key icons are displayed on the left of the first widget 29, and a part of shortcut key icons are displayed on the right of the first widget 29. When the auxiliary display screen is switched from the second interface 30 to the first interface 28, a second transition interface 33 of switching from the second interface 30 to the first interface 28 may be displayed. The second transition interface 33 takes a second widget 31 as a boundary, a part of virtual key icons are displayed on the left of the second widget 31, and a part of shortcut key icons are displayed on the right of the second widget 31.

Optionally, after steps 319 to 321, steps 316 to 318 may be continued to be performed. That is, steps 316 to 318 and steps 319 to 321 are two mutually inverse processes, which may be performed alternately.

Optionally, when the second interface is displayed on the auxiliary display screen, if a shortcut key icon in the auxiliary display screen is triggered, the main display screen will switch to a corresponding interface according to the shortcut key icon that is triggered, and the auxiliary display screen will automatically switch from the second interface to the first interface.

In view of above, in a method for controlling a screen provided by the embodiment of the present disclosure, a first widget or a second widget for performing interface switching is displayed in an auxiliary display screen, switching between an interface of the virtual key icon and an interface of the shortcut key icon is implemented by triggering the widget, which enriches interactive operation forms and improves operation efficiency.

FIG. 17 is yet another flow chart of a method for controlling a screen shown according to an aspect of the disclosure. The method for controlling a screen is applied to the terminals as shown in FIGS. 1 to 5. As shown in FIG. 17, the method for controlling a screen may include following steps.

In step 322, the first interface is displayed on the auxiliary display screen.

In step 323, a first predetermined gesture acting on the first interface is received, and a first instruction is generated based on the first predetermined gesture.

Optionally, the first predetermined gesture is sliding to the left.

Optionally, the first predetermined gesture is sliding leftward from a right edge of the auxiliary display screen.

The first instruction is used to instruct the auxiliary display screen to switch from the first interface to the second interface.

In step 324, the auxiliary display screen is controlled to switch from the first interface to the second interface according to the first instruction.

In step 325, the second interface is displayed on the auxiliary display screen.

In step 326, a second predetermined gesture acting on the second interface is received, and a second instruction based on the second predetermined gesture is generated.

Optionally, the second predetermined gesture is sliding to the right.

Optionally, the second predetermined gesture is sliding rightward from a left edge of the auxiliary display screen.

The second instruction is used to instruct the auxiliary display screen to switch from the second interface to the first interface.

In step 327, the auxiliary display screen is controlled to switch from the second interface to the first interface according to the second instruction.

In view of above, in the method for controlling a screen provided by the embodiment of the present disclosure, an acted first predetermined gesture or a second predetermined gesture is received in an auxiliary display screen, and switching between an interface of the virtual key icon and an interface of the shortcut key icon is achieved according to the predetermined gesture, which enriches interactive operation forms and improves operation efficiency.

Optionally, when the main display screen is in the inactive state, the predetermined information is displayed through the auxiliary display screen.

Figure 18:
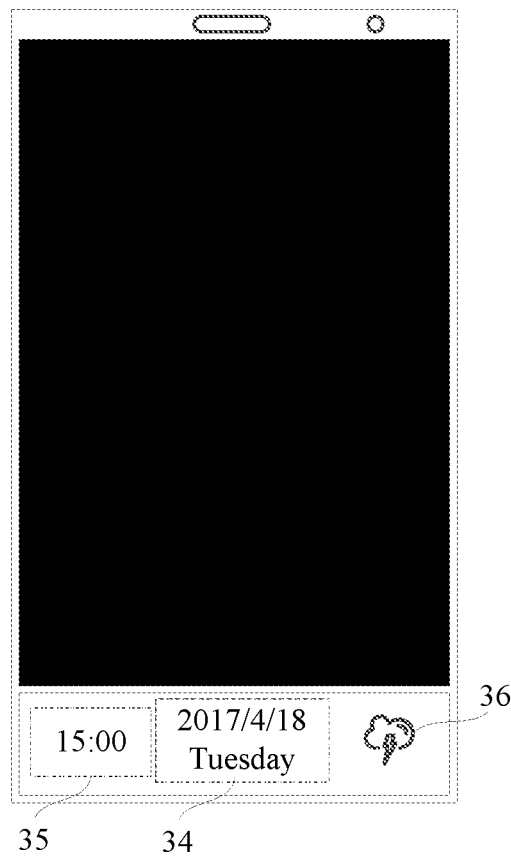
FIG. 18 is a schematic diagram of an auxiliary display screen displaying predetermined information shown according to an aspect of the disclosure.

Optionally, FIG. 18 is combined with and referred to. When the main display screen is in the inactive state, at least one of a current date 34, a current time 35 and a current weather 36 is displayed through the auxiliary display screen.

Figure 19:
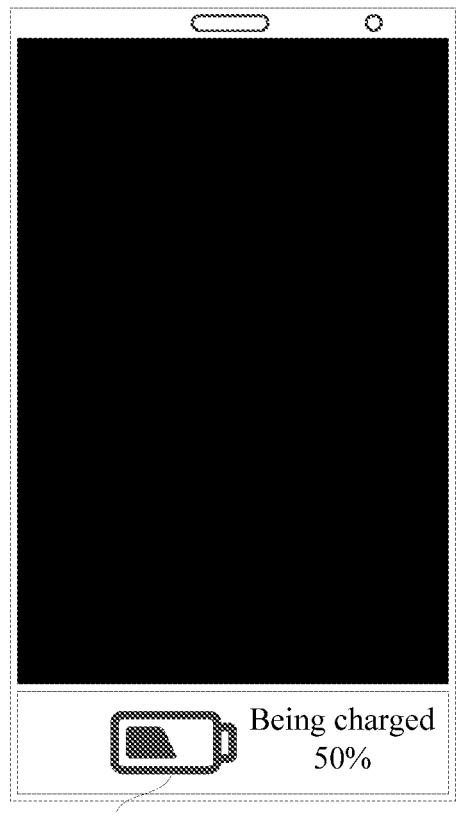
FIG. 19 is another schematic diagram of an auxiliary display screen displaying predetermined information shown according to an aspect of the disclosure.

Optionally, FIG. 19 is combined with and referred to. When a terminal is being charged, a charging state 37 of the terminal is displayed through the auxiliary display screen.

Figure 20:
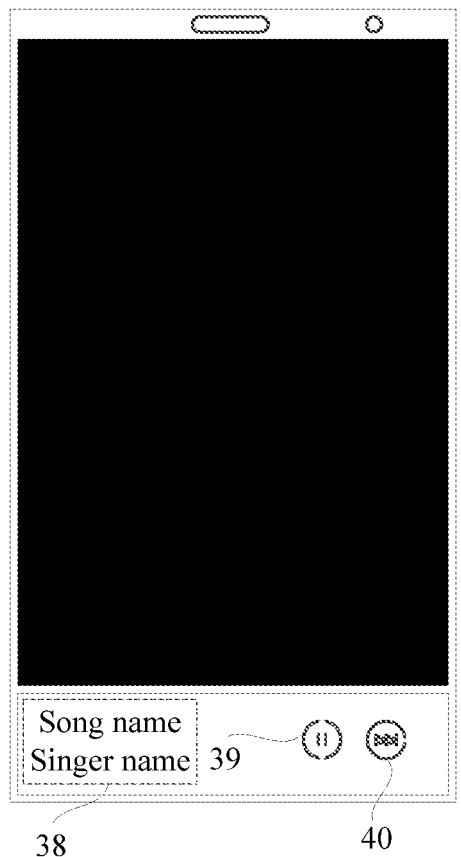
FIG. 20 is yet another schematic diagram of an auxiliary display screen displaying predetermined information shown according to an aspect of the disclosure.

Optionally, FIG. 20 is combined with and referred to. When the terminal is playing music, music playing information is displayed through the auxiliary display screen, wherein the music playing information includes a music playing interface and/or song information 38, the music playing interface includes a song switch control 39 and a song switching control 40, and the song information 38 includes at least one of a song name, a singer name, a song progress bar and lyrics.

Optionally, when the terminal is installed with a sports health application, at least one of a step count, heartbeat, and pulse is displayed through the auxiliary display screen.

Optionally, when the terminal receives notification information, a notification widget of the notification information is displayed through the auxiliary display screen, wherein the prompt widget is used for prompting presence of unread notification information.

Corresponding to steps 301 to 303, when the notification widget of the notification information is triggered, the main display screen is awakened and the information content of the notification information is displayed.

Optionally, when the terminal receives notification information, the information content of the notification information is displayed through the auxiliary display screen.

According to settings of the user, the terminal may also display the information content of the notification information directly on the auxiliary display screen.

For example, when the terminal receives a short message, contents of the short message may be displayed through a manner of moving captions.

In view of above, through a method for controlling a screen provided by the embodiment of the present disclosure, when the main display screen is in an inactive state, predetermined information will be displayed on an auxiliary display screen, which satisfies requirement of a user for some small functions while saving power consumption of a terminal.

Figure 21:
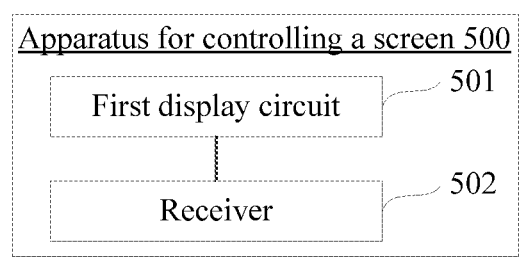
FIG. 21 is a block diagram of a structure of an apparatus for controlling a screen shown according to an aspect of the disclosure.

FIG. 21 is a block diagram of a structure of an apparatus for controlling a screen shown according to an aspect of the disclosure. The apparatus for controlling a screen is applied in terminals as shown in FIGS. 1 to 5. As shown in FIG. 21, the apparatus for controlling a screen 500 may include: a first display circuit 501 and a receiver 502.

The first display circuit 501 is configured to display a predetermined content on the auxiliary display screen.

The receiver 502 is configured to receive a first predetermined operation signal corresponding to a predetermined content displayed by the first display circuit 501 and control the main display screen to perform a predetermined action according to the first predetermined operation signal.

The predetermined action includes at least one of adjusting screen brightness and switching an interface.

In view of above, according to the apparatus for controlling a screen provided by the embodiment of the present disclosure, a main display screen and an auxiliary display screen are provided on a screen, and a predetermined content is displayed on the auxiliary display screen. A first predetermined operation signal corresponding to the predetermined content is received through the auxiliary display screen, and the main display screen is controlled to perform a predetermined action of adjusting screen brightness or switching an interface according to the first predetermined operation signal, such that linked operation between the main display screen and the auxiliary display screen may be realized, which solves the problem of a poor operation manner of a single screen, achieves the effect of providing linked operation between the main display screen and the auxiliary display screen, and enriches interactive operation forms.

Figure 22:
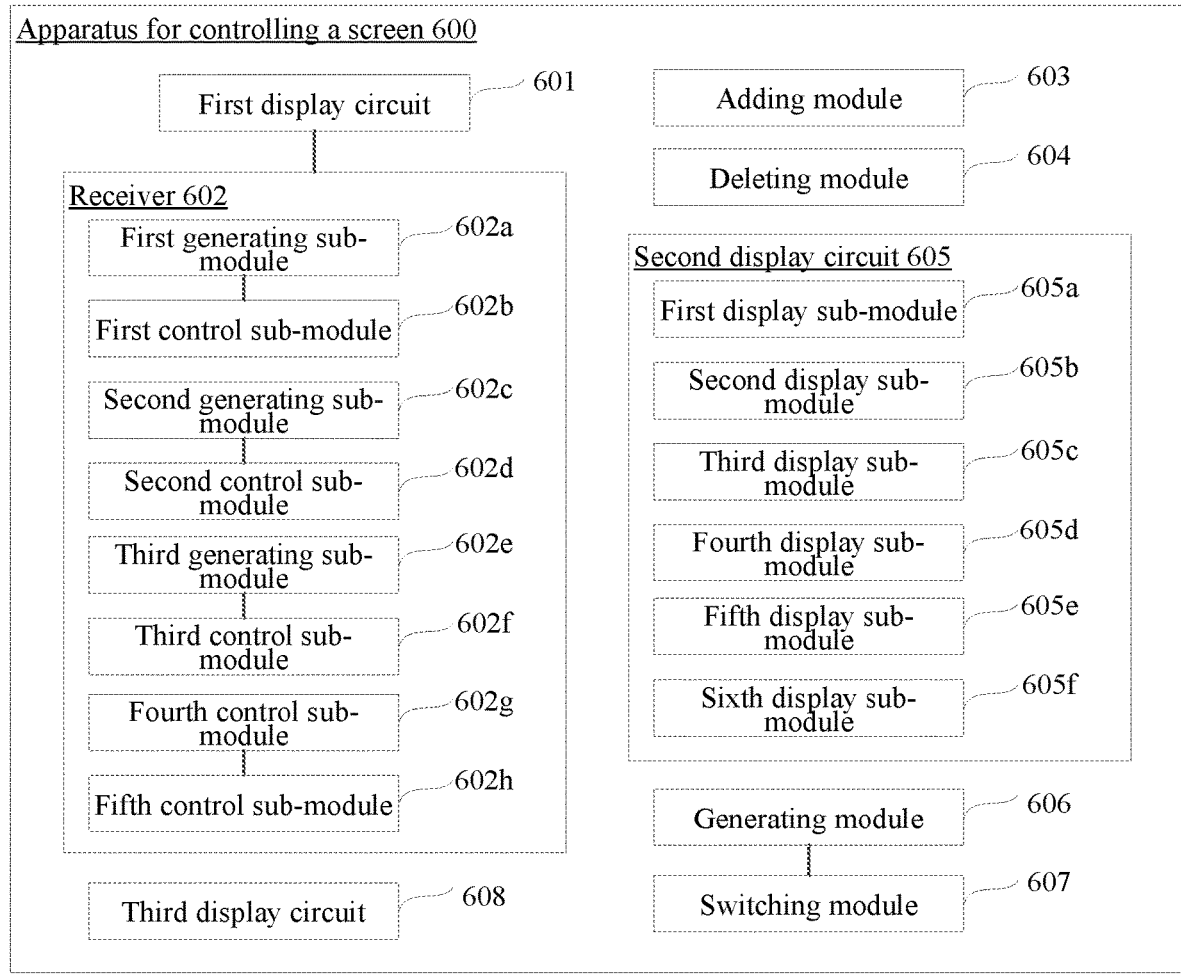
FIG. 22 is another block diagram of a structure of an apparatus for controlling a screen shown according to an aspect of the disclosure.

FIG. 22 is another block diagram of a structure of an apparatus for controlling a screen shown according to an aspect of the disclosure. The apparatus for controlling a screen is applied in terminals as shown in FIGS. 1 to 5. As shown in FIG. 22, the apparatus for controlling a screen 600 may include: a first display circuit 601 and a receiver 602.

The first display circuit 601 is configured to display a predetermined content on the auxiliary display screen.

The receiver 602 is configured to receive a first predetermined operation signal corresponding to the predetermined content displayed by the first display circuit 601 and control the main display screen to perform a predetermined action according to the first predetermined operation signal, wherein the predetermined action includes at least one of adjusting screen brightness and switching an interface.

Optionally, the receiver 602 includes a first generating sub-module 602*a* and a first control sub-module 602*b*.

The first generating sub-module 602*a* is configured to generate an information viewing signal when the prompt widget of the notification information in the auxiliary display screen is triggered, wherein the prompt widget is used for prompting presence of unread notification information.

The first control sub-module 602*b* is configured to control the main display screen to switch from an inactive state to an active state based on the information viewing signal generated by the first generating sub-module 602*a*, and display an information content of the notification information through the main display screen.

Optionally, the first display circuit 601 is further configured to display state information of being receiving a voice input on the auxiliary display screen when the terminal receives the voice input.

Optionally, the receiver 602 is further configured to: when the voice input is finished, generate a voice control signal based on a content of the voice input, control the main display screen to switch from the inactive state to the active state according to the voice control signal, and display the content of the voice input or a function interface triggered by the content of the voice input through the main display screen.

Optionally, the receiver 602 includes a second generating sub-module 602*c* and a second control sub-module 602*d*.

The second generating sub-module 602*c* is configured to generate a first trigger operation signal when the virtual key icon is triggered.

The virtual key icon is a logical key corresponding to the operating system, wherein the virtual key icon includes at least one of a menu widget, a homepage widget and a return widget.

The second control sub-module 602*d* is configured to control the main display screen to switch to an interface indicated by the virtual key icon according to the first trigger operation signal generated by the second generating sub-module 602*c*.

Optionally, the receiver 602 includes a third generating sub-module 602*e* and a third control sub-module 602*f*.

The third generating sub-module 602*e* is configured to generate a second trigger operation signal when the shortcut key icon is triggered.

The shortcut key icon is a shortcut key corresponding to a predetermined function, wherein the shortcut key icon includes at least one of a search widget, a screenshot widget, a collection widget, a flashlight switch widget, a recording widget and a photographing widget.

The third control sub-module 602*f* is configured to control the main display screen to switch to an interface indicated by the shortcut key icon according to the second trigger operation signal generated by the third generating sub-module 602*e*.

Optionally, the receiver 602 includes a fourth control sub-module 602*g* and a fifth control sub-module 602*h*.

The fourth control sub-module 602*g* is configured to control the main display screen to display an icon identical to the shortcut key icon when a continuous trigger operation signal acting on the shortcut key icon is received.

The fifth control sub-module 602h is configured to control the main display screen to switch to an interface indicated by the shortcut key icon when the continuous trigger operation signal is finished.

Optionally, the apparatus for controlling a screen 600 further includes an adding module 603 and a deleting module 604.

The adding module 603 is configured to, when an icon adding instruction is received, add a shortcut key icon corresponding to the icon adding instruction to the auxiliary display screen.

The deleting module 604 is configured to, when an icon deleting instruction is received, delete the shortcut key icon corresponding to the icon deleting instruction from the auxiliary display screen.

Optionally, the apparatus for controlling a screen 600 further includes a second display circuit 605.

The second display circuit 605 is configured to, when the main display screen is in an inactive state, display the predetermined information through the auxiliary display screen.

Optionally, the second display circuit 605 includes a first display sub-module 605a, a second display sub-module 605b, a third display sub-module 605c, a fourth display sub-module 605d, a fifth display sub-module 605e and a sixth display sub-module 605f.

The first display sub-module 605a is configured to display at least one of a current date, a current time and a current weather through the auxiliary display screen.

The second display sub-module 605b is configured to, when a terminal is being charged, display a charging state of the terminal through the auxiliary display screen.

The third display sub-module 605c is configured to, when the terminal is playing music, display music playing information through the auxiliary display screen, wherein the music playing information includes a music playing interface and/or song information, the music playing interface includes a song switch control and a song switching control, the song information includes at least one of a song name, a singer name, a song progress bar and lyrics.

The fourth display sub-module 605d is configured to, when the terminal is installed with a sports health application, display at least one of a step count, heartbeat, and pulse through the auxiliary display screen.

The fifth display sub-module 605e is configured to, when the terminal receives notification information, display a notification widget of the notification information through the auxiliary display screen, wherein the prompt widget is used for prompting presence of unread notification information.

The sixth display sub-module 605f is configured to, when the terminal receives the notification information, display an information content of the notification information through the auxiliary display screen.

Optionally, the apparatus for controlling a screen 600 further includes a generating module 606 and a switching module 607.

The generating module 606 is configured to receive a second predetermined operation acting on the auxiliary display screen to generate a second predetermined operation signal.

The switching module 607 is configured to control the auxiliary display screen to switch between the first interface and the second interface according to the second predetermined operation signal.

The first interface includes a virtual key icon, and the second interface includes a shortcut key icon.

Optionally, the generating module 606 is further configured to: display the first interface on the auxiliary display screen, and generate a first trigger signal when a first widget in the first interface is triggered, wherein the first widget is used for directing the first interface to switch to the second interface; or, display the second interface on the auxiliary display screen, and generate a second trigger signal when a second widget in the second interface is triggered, wherein the second widget is used for directing the second interface to switch to the first interface.

Optionally, the switching module 607 is further configured to: control the auxiliary display screen to switch from the first interface to the second interface according to the first trigger signal; or, control the auxiliary display screen to switch from the second interface to the first interface according to the second trigger signal.

Optionally, the generating module 606 is further configured to: display the first interface on the auxiliary display screen, receive a first predetermined gesture acting on the first interface, and generate a first instruction based on the first predetermined gesture; or, display the second interface on the auxiliary display screen, receive a second predetermined gesture acting on the second interface, and generate a second instruction based on the second predetermined gesture.

Optionally, the switching module 607 is further configured to: control the auxiliary display screen to switch from the first interface to the second interface according to the first instruction; or, control the auxiliary display screen to switch from the second interface to the first interface according to the second instruction.

Optionally, the apparatus for controlling a screen 600 further includes a third display circuit 608.

The third display circuit 608 is configured to, when the main display screen is switched to a predetermined interface, control the auxiliary display screen to display a shortcut key icon corresponding to the predetermined interface.

In view of above, according to the apparatus for controlling a screen provided by the embodiment of the present disclosure, a main display screen and an auxiliary display screen are provided on a screen, and a predetermined content is displayed on the auxiliary display screen. A first predetermined operation signal corresponding to the predetermined content is received through the auxiliary display screen, and the main display screen is controlled to perform a predetermined action of adjusting screen brightness or switching an interface according to the first predetermined operation signal, such that linked operation between the main display screen and the auxiliary display screen may be realized, which solves the problem of a poor operation manner of a single screen, achieves the effect of providing linked operation between the main display screen and the auxiliary display screen, and enriches interactive operation forms.

A prompt widget of notification information is displayed in the auxiliary display screen, and a main display screen is controlled to be brightened when the prompt widget is triggered, so that the main display screen may achieve linked display based on operation in the auxiliary display screen, thus enriching interactive operation forms.

State information of being receiving a voice input is displayed on the auxiliary display screen when the voice is input, and a main display screen may be controlled to be brightened and display corresponding contents based on the voice control signal generated when the voice input is finished, such that the main display screen may achieve linked display based on operation in the auxiliary display screen, thus enriching interactive operation forms.

When a virtual key icon on an auxiliary display screen is triggered, a first trigger operation signal is generated to control a main display screen to switch an interface, so that the terminal may satisfy normal requirement of screen control.

A second trigger operation signal is generated to control a main display screen to switch an interface when a shortcut key icon on an auxiliary display screen is triggered, so that the terminal may achieve a shortcut function according to operation on the auxiliary display screen, which improves operation efficiency.

When a shortcut key icon on an auxiliary display screen is continuously triggered, the same icon is displayed in a main display screen. In this way, when a finger shields a shortcut key icon in the auxiliary display screen, it may facilitate the user viewing the icon to be triggered. In addition, the main display screen is controlled to switch an interface when the continuous trigger operation signal is finished, such that a terminal may achieve a shortcut function according to operation on the auxiliary display screen, which improves operation efficiency.

A first widget or a second widget for performing interface switching is displayed in an auxiliary display screen, such that switching between an interface of the virtual key icon and an interface of the shortcut key icon is implemented by triggering the widgets, which enriches interactive operation forms and improves operation efficiency.

An acted first predetermined gesture or a second predetermined gesture is received in an auxiliary display screen, such that switching between an interface of the virtual key icon and an interface of the shortcut key icon is achieved according to the predetermined gesture, which enriches interactive operation forms and improves operation efficiency.

When a main display screen is in the inactive state, predetermined information will be displayed on an auxiliary display screen, which satisfies requirement of a user for some small functions while saving power consumption of a terminal.

It should be noted that: in the apparatus for controlling a screen provided by the above embodiment, control of the screen is exemplified only by the division of the above-described functional modules. In practical applications, the above-described function assignment may be completed by different function modules as needed. That is, an internal structure of a terminal or a base station is divided into different functional modules, to complete all or part of the functions described above. In addition, the apparatus embodiment for controlling a screen control described above and the method embodiment for controlling a screen belong to the same concept. The specific implementation process of the apparatus embodiment for controlling a screen control may be referred to the method embodiment for detail, which will not be repeated herein.

Those skilled in the art will appreciate that the units and algorithm steps of each of examples described in combination with embodiments disclosed herein may be implemented in electronic hardware, or in combination with computer software and electronic hardware. Whether these functions are implemented in hardware or software depends on the specific application and design constraints of the technical solution. The professionals may use different methods to implement the described functions for each particular application, but such implementations should not be considered beyond the scope of the present disclosure.

It will be apparent to those skilled in the art that the specific operation processes of the systems, apparatuses and units described above may be referred to corresponding processes in the foregoing method embodiments described above, for the convenience and simplicity of the description, which will not be repeated herein.

In several embodiments provided by the present application, it should be understood that the disclosed systems, apparatus, and methods may be implemented by other ways. For example, the apparatus embodiments described above are merely illustrative, for example, the division of the units may be merely division of logical functions. There may be additional division ways in actual implementation. For example, a plurality of units or components may be combined or integrated into another system, or some features may be omitted or not executed. In another aspect, the mutual coupling or direct coupling or communication connection shown or discussed may be indirect coupling or communication connection through some interfaces, apparatuses or units, which may be electrical, mechanical, or otherwise.

The units described as separate components may be or may not be physically separate, and the parts illustrated as units may be or may not be physical units, and may be at the same location, or may be distributed to a plurality of units over the network. A part of or the whole of the units may be selected as desired to achieve the objective of technical solution of the present disclosure.

In addition, the functional units in various embodiments of the present disclosure may be integrated in one processing unit, or each unit may be separately physically present, or two or more units may be integrated in one unit.

The functions may be stored in a computer-readable storage medium if they are implemented in the form of software functional units and sold or used as standalone products. Based on this understanding, the technical solution of the present disclosure essentially, or a part which contributes to the related art, or part of the technical solution may be embodied in the form of a software product stored in a storage medium, including several instructions used to enable one computer device (which may be a personal computer, a server, or a network device, etc.) to perform all or part of the steps described in various embodiments of the present disclosure. The above-mentioned storage medium includes a USB disk, a mobile hard disk, a read-only memory (ROM), a random access memory (RAM), a magnetic disk, an optical disk, or other media that may store program codes.

As described above, only the specific embodiments of the present disclosure are illustrated, but the protection scope of the present disclosure is not limited thereto. Any person skilled in the art will be able to easily think of variations or substitutions within the technical scope disclosed by the present disclosure and they all should be covered within the protection scope of the present disclosure. Accordingly, the protection scope of the present disclosure is defined by the protection scope of the claims.

What is claimed is:

1. A method for controlling a screen of an electronic device, wherein the screen comprises a main display screen and an auxiliary display screen, both the main display screen and the auxiliary display screen are touch screens on a same surface of the electronic device, and the method comprises:
   displaying a predetermined content on the auxiliary display screen;
   receiving a first predetermined operation signal corresponding to the predetermined content and controlling the main display screen to perform a predetermined action according to the first predetermined operation signal, wherein the predetermined action comprises at least one actions of adjusting screen brightness and switching an interface, and the predetermined content is a first interface or a second interface;

receiving a second predetermined operation acting on the auxiliary display screen to generate a second predetermined operation signal, further comprising:

displaying the first interface on the auxiliary display screen, and generating a first trigger signal when a first widget in the first interface is triggered, wherein the first widget is used for directing the first interface to switch to the second interface; or displaying the second interface on the auxiliary display screen, and generating a second trigger signal when a second widget in the second interface is triggered, wherein the second widget is used for directing the second interface to switch to the first interface; and wherein controlling the auxiliary display screen to switch between the first interface and the second interface according to the second predetermined operation signal comprises:

controlling the auxiliary display screen to switch from the first interface to the second interface according to the first trigger signal; or controlling the auxiliary display screen to switch from the second interface to the first interface according to the second trigger signal;

and controlling the auxiliary display screen to switch between the first interface and the second interface according to the second predetermined operation signal, wherein the first interface includes a virtual key icon, and the second interface includes a shortcut key icon.

2. The method according to claim 1, wherein the predetermined content is a prompt widget of notification information, and the predetermined action is adjusting screen brightness, and receiving the first predetermined operation signal corresponding to the predetermined content and controlling the main display screen to perform the predetermined action according to the first predetermined operation signal comprises:

generating an information viewing signal when the prompt widget of the notification information in the auxiliary display screen is triggered, wherein the prompt widget is used for prompting presence of unread notification information; and controlling the main display screen to switch from an inactive state to an active state based on the information viewing signal, and displaying an information content of the notification information through the main display screen.

3. The method according to claim 1, wherein the predetermined action is adjusting screen brightness, the displaying a predetermined content on the auxiliary display screen comprises:

displaying state information of being receiving a voice input on the auxiliary display screen when a terminal receives the voice input; and receiving the first predetermined operation signal corresponding to the predetermined content and controlling the main display screen to perform the predetermined action according to the first predetermined operation signal comprises:

when the voice input is finished, generating a voice control signal based on a content of the voice input, controlling the main display screen to switch from an inactive state to an active state according to the voice control signal, and displaying the content of the voice input or a function interface triggered by the content of the voice input through the main display screen.

4. The method according to claim 1, wherein the predetermined content is a virtual key icon, the predetermined action is switching the interface, and receiving the first predetermined operation signal corresponding to the predetermined content and controlling the main display screen to perform the predetermined action according to the first predetermined operation signal comprises:

generating a first trigger operation signal when the virtual key icon is triggered; and controlling the main display screen to switch to an interface indicated by the virtual key icon according to the first trigger operation signal, wherein the virtual key icon is a logical key corresponding to an operating system, and the virtual key icon comprises at least one of following widgets: a menu widget, a homepage widget, and a return widget.

5. The method of claim 1, wherein the predetermined content is a shortcut key icon, the predetermined action is switching the interface, and receiving the first predetermined operation signal corresponding to the predetermined content and controlling the main display screen to perform the predetermined action according to the first predetermined operation signal comprises:

generating a second trigger operation signal when the shortcut key icon is triggered; and controlling the main display screen to switch to an interface indicated by the shortcut key icon according to the second trigger operation signal, wherein the shortcut key icon is a shortcut key corresponding to a predetermined function, and the shortcut key icon comprises at least one of following icons: a search widget, a screenshot widget, a collection widget, a flashlight switch widget, a recording widget, and a photographing widget.

6. The method of claim 1, wherein the predetermined content is a shortcut key icon, the predetermined action is switching the interface, and receiving the first predetermined operation signal corresponding to the predetermined content and controlling the main display screen to perform the predetermined action according to the first predetermined operation signal comprises:

controlling the main display screen to display an icon identical to the shortcut key icon when a continuous trigger operation signal acting on the shortcut key icon is received; and controlling the main display screen to switch to an interface indicated by the shortcut key icon when the continuous trigger operation signal is finished.

7. The method according to claim 1, wherein the method further comprises:

when the main display screen is in an inactive state, displaying a predetermined information through the auxiliary display screen.

8. The method according to claim 1, wherein the method further comprises:

when the main display screen is switched to a predetermined interface, controlling the auxiliary display screen to display a shortcut key icon corresponding to the predetermined interface.

9. An apparatus for controlling a screen, wherein the screen comprises a main display screen and an auxiliary display screen, both of the main display screen and the auxiliary display screen are touch screens on a same surface of the apparatus, and the apparatus comprising:
  a processor; and
  a memory for storing instructions executable by the processor,
  wherein the processor is configured to perform:
  displaying a predetermined content on the auxiliary display screen;
  receiving a first predetermined operation signal corresponding to the predetermined content and controlling the main display screen to perform a predetermined action according to the first predetermined operation signal, wherein the predetermined action comprises at least one of adjusting screen brightness and switching an interface, and the predetermined content is a first interface or a second interface;
  receiving a second predetermined operation acting on the auxiliary display screen to generate a second predetermined operation signal, further comprising:
    displaying the first interface on the auxiliary display screen, and generating a first trigger signal when a first widget in the first interface is triggered, wherein the first widget is used for directing the first interface to switch to the second interface; or
    displaying the second interface on the auxiliary display screen, and generating a second trigger signal when a second widget in the second interface is triggered, wherein the second widget is used for directing the second interface to switch to the first interface; and
    wherein controlling the auxiliary display screen to switch between the first interface and the second interface according to the second predetermined operation signal comprises:
      controlling the auxiliary display screen to switch from the first interface to the second interface according to the first trigger signal; or
      controlling the auxiliary display screen to switch from the second interface to the first interface according to the second trigger signal;
    and
    controlling the auxiliary display screen to switch between the first interface and the second interface according to the second predetermined operation signal,
  wherein the first interface includes a virtual key icon, and the second interface includes a shortcut key icon.

10. The apparatus according to claim 9, wherein the predetermined content is a prompt widget of notification information, and the processor is further configured to perform:
  generating an information viewing signal when the prompt widget of the notification information in the auxiliary display screen is triggered, wherein the prompt widget is used for prompting presence of unread notification information; and
  controlling the main display screen to switch from an inactive state to an active state based on the information viewing signal, and displaying an information content of the notification information through the main display screen.

11. The apparatus according to claim 9, wherein the predetermined action is adjusting screen brightness, and the processor is further configured to perform:
  displaying state information of being receiving a voice input on the auxiliary display screen when a terminal receives the voice input; and
  when the voice input is finished, generating a voice control signal based on a content of the voice input, controlling the main display screen to switch from an inactive state to an active state according to the voice control signal, and displaying the content of the voice input or a function interface triggered by the content of the voice input through the main display screen.

12. The apparatus according to claim 9, wherein the predetermined content is a virtual key icon, the predetermined action is switching the interface, and the processor is further configured to perform:
  generating a first trigger operation signal when the virtual key icon is triggered; and
  controlling the main display screen to switch to an interface indicated by the virtual key icon according to the first trigger operation signal,
  wherein the virtual key icon is a logical key corresponding to an operating system, and the virtual key icon comprises at least one of following icons: a menu widget, a homepage widget, and a return widget.

13. The apparatus of claim 9, wherein the predetermined content is a shortcut key icon, and the predetermined action is switching the interface, and the processor is further configured to perform:
  generating a second trigger operation signal when the shortcut key icon is triggered; and
  controlling the main display screen to switch to an interface indicated by the shortcut key icon according to the second trigger operation signal,
  wherein the shortcut key icon is a shortcut key corresponding to a predetermined function, and the shortcut key icon comprises at least one of following icons: a search widget, a screenshot widget, a collection widget, a flashlight switch widget, a recording widget, and a photographing widget.

14. The apparatus of claim 9, wherein the predetermined content is a shortcut key icon, and the predetermined action is switching the interface, and the processor is further configured to perform:
  controlling the main display screen to display an icon identical to the shortcut key icon when a continuous trigger operation signal acting on the shortcut key icon is received; and
  controlling the main display screen to switch to an interface indicated by the shortcut key icon when the continuous trigger operation signal is finished.

15. The apparatus according to claim 9, wherein the processor is further configured to perform:
  when the main display screen is in an inactive state, displaying a predetermined information through the auxiliary display screen.

16. The apparatus according to claim 9, wherein the processor is further configured to perform:
  when the main display screen is switched to a predetermined interface, controlling the auxiliary display screen to display a shortcut key icon corresponding to the predetermined interface.

17. A non-transitory storage medium having stored therein instructions that, when executed by one or more processors of a terminal having a screen, wherein the screen comprises a main display screen and an auxiliary display screen and both of the main display screen and the auxiliary display screen are touch screens and provided on the same surface, causes the terminal to control the screen by performing:
  displaying a predetermined content on the auxiliary display screen;

receiving a first predetermined operation signal corresponding to the predetermined content and controlling the main display screen to perform a predetermined action according to the first predetermined operation signal, wherein the predetermined action comprises at least one of adjusting screen brightness and switching an interface, and the predetermined content is a first interface or a second interface;

receiving a second predetermined operation acting on the auxiliary display screen to generate a second predetermined operation signal, further comprising:
- displaying the first interface on the auxiliary display screen, and generating a first trigger signal when a first widget in the first interface is triggered, wherein the first widget is used for directing the first interface to switch to the second interface; or
- displaying the second interface on the auxiliary display screen, and generating a second trigger signal when a second widget in the second interface is triggered, wherein the second widget is used for directing the second interface to switch to the first interface; and wherein controlling the auxiliary display screen to switch between the first interface and the second interface according to the second predetermined operation signal comprises:
- controlling the auxiliary display screen to switch from the first interface to the second interface according to the first trigger signal; or
- controlling the auxiliary display screen to switch from the second interface to the first interface according to the second trigger signal;

and controlling the auxiliary display screen to switch between the first interface and the second interface according to the second predetermined operation signal, wherein the first interface includes a virtual key icon, and the second interface includes a shortcut key icon.

* * * * *